Figures 1, 2:
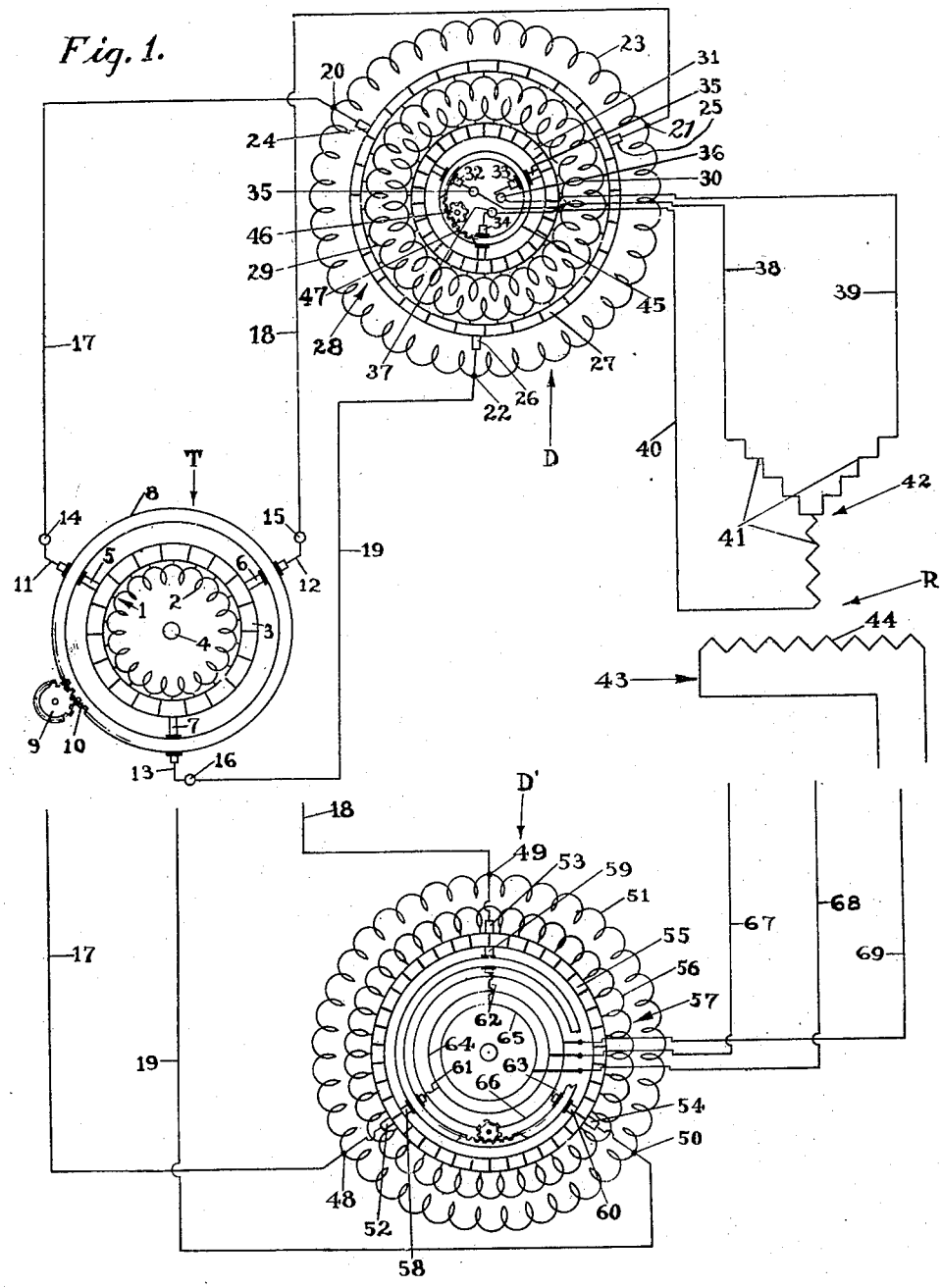

April 8, 1930.   H. L. TANNER   1,753,322
PHASE CHANGING APPARATUS
Filed Dec. 9, 1924

INVENTOR.
Harry L. Tanner
BY Moakley & Gill
ATTORNEYS.

Patented Apr. 8, 1930

1,753,322

UNITED STATES PATENT OFFICE

HARRY L. TANNER, OF BROOKLYN, NEW YORK, ASSIGNOR TO FORD INSTRUMENT COMPANY, INC., OF LONG ISLAND CITY, NEW YORK, A CORPORATION OF NEW YORK

PHASE-CHANGING APPARATUS

Application filed December 9, 1924. Serial No. 754,738.

This invention relates to apparatus for changing the phase relation between two circuits connected thereby or an electrical differential as it may be called. One important field for the invention is in signal transmission systems, and more particularly in such systems of the same general character as that disclosed in my copending application Serial No. 724,912, filed July 8, 1924.

In the second form of the invention of said copending application, the transmitter comprises a motor driven direct current armature from the commutator of which current is taken by three brushes movable in unison to different positions around the axis of the armature to transmit suitable signals to the motor of a receiver. For this purpose the current is transmitted from the transmitter brushes to input leads of a three phase stator with which is associated a rotor in the form of a direct current armature from the commutator of which current is taken by three brushes and transmitted to the receiver. The rotor of the intermediate device, or motor relay as it is called in said application, is driven by a direct current motor outside of the device. By virtue of this arrangement additional power may be supplied to the system. Although the three brushes of the intermediate device are mounted for movement around the axis of the rotor they are ordinarily retained in the same position and are shifted only when it is desired to change the position relations between the movable parts of the transmitter and receiver by changing the phase relations between the input and output leads of the intermediate device or differential, for the purpose of introducing corrections.

One object of the present invention is to provide a device of the same general character as the above described differential but which can be used to greater advantage in certain systems. Other objects of the invention are to provide a self-contained differential, that is a differential comprising a rotor driving motor using the same current as is used in energizing the field windings instead of a separate motor as in my copending application referred to above and a differential comprising a polyphase motor adapted to run at a constant speed.

The above objects as well as others which will hereinafter appear are attained according to one form of the invention by providing a device in which current is supplied through a plurality of conductors to a polyphase field and also to a plurality of brushes contacting with a direct current commutator connected with an armature winding to cause the rotor to be rotated. The rotor also carries a generator winding connected with a second commutator from which current passes through a plurality of brushes to the field winding of a receiver motor to cause the latter to be turned to the desired positions. Such results are also obtained according to another form of the invention by using only one winding on the armature and connecting the same with a single commutator contacting with a set of brushes receiving the same current as supplied to the field of the differential and by using a second set of brushes contacting with said single commutator to supply current to a receiver motor to control the same. It should be understood that several receivers may be controlled through a single differential, and that, although in the illustrative forms of the invention the second sets of brushes are shifted to change the phase relations between the two sets of brushes, the same result may be obtained in other ways as by shifting the stator of the differential.

The particular nature of the invention will appear more clearly from a description of certain preferred embodiments as shown in the accompanying drawings in which, Fig. 1 is a representation of a system embodying one form of the invention, and Fig. 2 is a view showing a modified form of the invention.

Referring particularly to Fig. 1, a direct current armature 1, comprising a winding 2 and a commutator 3, mounted upon a shaft 4, is rotated in a suitable field by any suitable means and current is taken from the commutator 3 by brushes herein shown as three in number 5, 6 and 7, carried by a ring 8 rotatably mounted and adjustably positioned by suitable means such as a manually operable pinion 9 meshing with teeth 10 on the ring 8. The brushes 5, 6 and 7 are insulated from the ring 8 and are connected by leads 11, 12 and 13 respectively with slip rings 14, 15 and 16, represented by conventional symbols. It should be understood that these slip rings although insulated from the ring 8 are connected thereto so as to rotate therewith. The armature 1, commutator 3, brushes 5, 6 and 7 toothed ring 8, and manually operable pinion 9 form part of a transmitter T.

From the slip rings 14, 15 and 16 current is taken by brushes, not shown, and carried by conductors 17, 18 and 19 respectively to points 20, 21 and 22 of a field winding 23 of an electric differential designated as a whole by D. The conductors 17, 18 and 19 are also connected with brushes 24, 25 and 26 engaging a commutator 27 on an armature 28 connected by suitable leads with a winding 29 of the armature, so that the armature will be driven by the current supplied through said conductors 17, 18 and 19. The armature 28 is also provided with a generator winding 30 connected by suitable taps with a commutator 31 from which current is taken by three brushes 32, 33 and 34, slip rings 35, 36 and 37, brushes, not shown, and conductors 38, 39 and 40 to the winding 41 of a three-phase stator 42 of a receiver motor R having a rotor 43 including a winding 44 through which a single-phase current is passed.

Ordinarily there is no shifting of the brushes 32, 33 and 34, but such shifting may be effected for the purpose of adjusting the position of the indicator of the receiver R with reference to the position of the indicator of the transmitter to introduce corrections or the like. To this end the brushes 32, 33 and 34 are mounted in but insulated from a rotatable ring 45 driven by means of a pinion 46 meshing with teeth 47 on the ring.

When the armature 1 of the transmitter T is rotating, certain potential conditions are set up at the three brushes 5, 6 and 7 and, through conductors 17, 18 and 19, there are set up at the points 20, 21 and 22 of the field winding 23 of the differential D differences in potential corresponding to the instantaneous values in an alternating current circuit. A magnetic field is thus set up and the armature 28, energized from the conductors 17, 18 and 19 through brushes 24, 25 and 26, is caused to turn. The motor including the field winding 23 and the armature 28 is similar to a usual form of three-phase induction motor, except that it has a commutator like a direct current motor.

As a result of such rotation of the armature 28, there are set up at brushes 32, 33 and 34 potential conditions similar to those at brushes 5, 6 and 7 and the receiver R is controlled accordingly, or in other words as it would be were it connected directly to the brushes of the transmitter. When the brushes 5, 6 and 7 are shifted in setting the transmitter for different indications, the potential conditions are changed at points 20, 21 and 22 in the field winding 23, and at the brushes 24, 25 and 26. The armature 28 will be rotated as before, but the potential conditions at the brushes 32, 33 and 34 and consequently in the winding of the three-phase stator of the receiver R will be changed, thus causing the rotor 43 to turn in accordance with the change at the transmitter T. By turning the pinion 46 the brushes 32, 33 and 34 may be displaced from their normal position to change the potential conditions at the receiver in relation to the conditions corresponding to those due to the brushes of the transmitter. This will cause relative displacement of the receiver with respect to the transmitter, which will be maintained throughout the operation of the receiver from the transmitter, thus providing for the introduction of desired corrections in the readings of the receiver.

In Fig. 2 is shown a modified form of differential, designated for convenience by D′, which may be controlled through the conductors 17, 18 and 19 leading from the transmitter T and connected, at points 48, 49 and 50 respectively with a field winding 51 of the differential and with brushes 52, 53 and 54 resting on a commutator 55 connected by suitable leads with the winding 56 of an armature 57. Also resting on the commutator 55 are brushes 58, 59 and 60 connected by leads 61, 62 and 63 with slip rings 64, 65 and 66 respectively from which connection is made through conductors 67, 68 and 69 with the stator winding of a receiver motor like that shown in Fig. 1.

The operation of the differential D′ is similar to that of the differential D but in D′ there is used only one armature winding 56 in place of the windings 29 and 30 in differential D and the two sets of brushes 52, 53 and 54 and 58, 59 and 60 contact with the same commutator 55 instead of with different commutators 27 and 31 as in differential D. It should be understood that two separate commutators connected with the single armature winding may be used instead of the single commutator 55, one commutator being used for one set of brushes and the other commutator being used for the other set of brushes.

It should be also understood that more than one receiver may be controlled through a single differential such as D or D′. While the invention has, for the purpose of illustration, been shown and described in connection with certain preferred forms, it may be used with other forms and various changes in its details may be made without departing from its principles as defined in the appended claims.

I claim:—

1. In a phase changing apparatus, a polyphase stator, polyphase leads connected therewith, a rotor having suitable windings and commutating means connected with said windings, a set of brushes connected with said polyphase leads and coacting with the commutating means so that current supplied through said leads will turn said rotor, a second set of brushes coacting with said commutating means for supplying polyphase current therefrom and means for producing relative displacement between the sets of brushes to change the phase relations between the currents supplied to and delivered by the brushes.

2. In a phase changing apparatus, a polyphase stator, a rotor having a commutator and windings connected therewith, polyphase leads connected with said stator, a set of brushes connecting said polyphase leads with said commutator to cause the rotor to be turned by current supplied from said leads, a generator winding on said rotor, a second commutator on said rotor and connected with said generator winding, a second set of brushes coacting with the second commutator and means for producing relative displacement between the sets of brushes to vary the phase relations between them.

3. In a phase changing apparatus, a polyphase stator, a rotor having a commutator and windings connected therewith, polyphase leads connected with said stator, a set of brushes connecting said polyphase leads with said commutator to cause the rotor to be turned by current supplied from said leads, a generator winding on said rotor, a second commutator on said rotor and connected with said generator winding, a second set of brushes equal in number to the brushes of the first set and coacting with the second commutator, and means for producing relative displacement between the sets of brushes to vary the phase relations between them.

4. In a phase changing apparatus, a polyphase stator, a rotor having a commutator and windings connected therewith, polyphase leads connected with said stator, a set of brushes to connect said polyphase leads with said commutator to cause the rotor to be turned by current supplied from said leads, a generator winding on said rotor, a second commutator on said rotor and connected with said generator winding, a second set of brushes equal in number to the brushes of the first set and coacting with the second commutator, and means to cause relative displacement between the stator and the second set of brushes to vary the phase relations between the two sets of brushes.

5. In a phase changing apparatus, a polyphase stator, polyphase leads connected therewith, a rotor having a plurality of windings, a plurality of commutating means severally connected to said windings, input brushes connecting said leads with said commutating means, output brushes coacting with another of said commutating means, and means for producing relative displacement between said input and output brushes to change the phase relations between them.

In testimony whereof I affix my signature.

HARRY L. TANNER.